3,770,640
REFRIGERANTS COLORED FOR LEAK
INDICATION
Philip Lee Bartlett, Wilmington, Del., assignor to E. I. du
Pont de Nemours and Company, Wilmington, Del.
Filed Nov. 22, 1971, Ser. No. 201,120
Int. Cl. C09k 3/02
U.S. Cl. 252—68
15 Claims

ABSTRACT OF THE DISCLOSURE

Refrigerants, refrigeration oils and refrigerant-refrigeration oil mixtures containing anthraquinone dyes having the structure

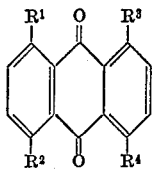

wherein $R^1$, $R^2$, $R^3$ and $R^4$ are each H or an anilino group, substituted by from 1 to 3 saturated alkyl groups having a total of from 4 to 24 carbon atoms, and wherein at least 2 and no more than 3 of $R^1$, $R^2$, $R^3$ and $R^4$ are H.

BACKGROUND OF THE INVENTION

(1) Field of the invention

The invention relates to refrigerants, refrigeration oils and refrigerant-refrigeration oils colored with anthraquinone dyes for leak detection. They are particularly useful in the field of vapor compression heat transfer processes wherein fluorocarbon refrigerants, at least in part in the liquid phase, are subjected to elevated temperature, e.g., in conventional home refrigeration, in freezing, air conditioning, heat pumping, and in heat engines employing power turbines.

(2) Description of the prior art

Various dyes have been employed to indicate the presence and location of leaks in vapor compression heat transfer systems such as refrigeration systems employing fluorocarbon refrigerants and refrigeration oils. Escaping refrigerant and/or oil containing dissolved dye are intended to deposit easily visible dye indications on the outside of the device, thus facilitating recognition and location of a leak. None of the dyes of the art employed for this purpose satisfy all of the stringent requirements of the refrigeration field.

U.S. 1,915,965 discloses the use of basic dyes such as methyl violet base, crystal violet, Auramine B, Rhodamine B, etc., as leak indicators in refrigeration systems. The basic dyes as a class are generally too unstable for use at the temperatures often encountered in modern refrigeration, i.e., temperatures as high as 300° F. and even about 400° F. at the compressor outlet valve. The color is destroyed and the dye is converted to tars which may plug the system. Further, such dyes generally possess inadequate solubility in the refrigeration oils. For example, methyl violet base dissolves to the extent of less than 1 wt. percent in well known "Suniso" 3GS refrigeration oil.

U.S. 3,370,013 discloses the use of oil soluble azo dyes as leak indicators in fluorocarbon refrigerants. Like the basic dyes, the azo dyes generally possess inadequate stability to heat and decompose under conditions of normal use. Additionally, some azo dyes do not have the requisite solubility, e.g., in refrigeration oil-dichlorodifluoromethane.

In addition to these problems, some of the dyes utilized in the art severely stain acrylic finishes such as those normally used in automobiles thus making it impractical to use refrigerants containing such dyes in automobile air-conditioners.

Alburger in U.S. 3,489,898 discloses solutions and dispersions of various fluorescent whitening agents in mixtures of non-volatile fluorotelomers and volatile trichlorofluoromethane of 1,1,2-trichloro-1,2,2-trifluoroethane and fluoromethane of 1,1,2-trifluoroethane and NORO,)((tlo the application of the solutions to the surfaces of containers intended for the storage of liquid oxygen. Surface defects in the containers are made visible by evaporating the surface solution leaving some solution entrapped in the surface cracks. Alburger also discloses, for this use, the dye 1,4-bis(4-methylanilino)anthraquinone. The same dye is disclosed as suitable in the process of U.S. 3,399,025 wherein the dye is tranfered from suspended trichlorofluoromethane to polymer granules in an aqueous slurry. The process is carried out under pressure and at temperatures up to about 275° F. for times up to one hour.

It has now been discovered that by incorporating anthaquinone dyes, having a designated structure, into fluorocarbon refrigerants, refrigeration oils and mixtures thereof, the resultant compositions provide positive indication of leaks anywhere in a vapor compression heat transfer system; possess adequate stability to the highest temperatures normally encountered in refrigeration systems in the presence of fluorinated refrigerants, refrigeration oils and materials of construction; do not interfere with the normal operation of such a heat transfer system and are easily removed from painted surfaces, as for example, automobile finishes, or refrigerator cabinets.

SUMMARY OF THE INVENTION

A composition which comprises
(A) a refrigeration liquid selected from the group consisting of
(a) a fluorocarbon refrigerant selected from the group consisting of
trichlorofluoromethane,
dichlorodifluoromethane,
chlorodifluoromethane,
1,1,2-trichloro-1,2,2-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope,
chlorotrifluoromethane,
chlorotrifluoromethane/trifluoromethane azeotrope,
bromotrifluoromethane,
trifluoromethane,
chloropentafluoroethane
difluoromethane/chloropentafluoroethane azeotrope,
chloropentafluoroethane/1,1-difluoroethane azeotrope,
dichlorofluoromethane,
dichlorodifluoromethane/chlorofluoromethane azeotrope,
chlorofluoromethane/1,2-dichlorotetrafluoroethane azeotrope,
difluoromethane, 1,2-dibromotetrafluoroethane,
1,1,1-trifluoroethane,
1,1-difluoro-1-chloroethane,
1,1-difluoroethane,
bromotrifluoromethane/difluoromethane azeotrope,
1,2-dichlorotetrafluoroethane/dichlorofluoromethane azeotrope, and
hexafluoroethane/trifluoromethane azeotrope,
  (b) a refrigeration oil and
  (c) a mixture of (a) and (b) and
(B) an anthraquinone dye or mixture of anthraquinone dyes having the structure

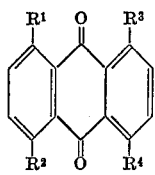

wherein $R^1$, $R^2$, $R^2$ and $R^4$ are each H or an anilino group substituted by from 1 to 3 saturated alkyl groups having a total of from 4 to 24 carbon atoms, and wherein at least 2 and no more than 3 of $R^1$ $R^2$, $R^3$ and $R^4$ are hydrogen, and wherein the anthraquinone dye is soluble in the refrigeration liquid, the concentration of said dye being at least about 0.007 gram per 100 cc. of said refrigeration liquid.

The process aspect of this invention is a process for indicating leaks in a vapor compression heat transfer system which comprises circulating through said system a composition of this invention as described above.

DESCRIPTION OF THE INVENTION

The present invention is directed to a composition which is particularly useful in the detection of leaks occurring in vapor compression heat transfer systems. The composition comprises a refrigeration liquid containing at least about 0.007 gram of a dissolved anthraquinone dye per 100 cc. of refrigeration liquid at 77° F., from about 0.007 to about 1.3 grams of dye per 100 cc. of refrigeration oil being preferred in most instances. By the term "refrigeration liquid" as used herein is meant a fluorocarbon refrigerant, a refrigeration oil or a mixture of a fluorocarbon refrigerant and refrigeration oil.

Useful fluoocarbon refrigerants include trichlorofluoromethane,
dichlorodifluoromethane,
chlorodifluoromethane,
1,1,2-trichloro-1,2,2-trifluoroethane,
1,2-dichloro-1,1,2,2-tetrafluoroethane,
1,1-difluoroethane/dichlorodifluoromethane azeotrope (U.S. Pat. 2,479,259, Re. 23,358),
chloropentafluoroethane/chlorodifluoromethane azeotrope (U.S. Pat. 2,641,579),
chlorotrifluoromethane,
chlorotrifluoromethane/trifluoromethane azeotrope (British Pat. 1,063,416),
bromotrifluoromethane,
trifluoromethane,
chloropentafluoroethane,
difluoromethane/chloropentafluoroethane azeotrope (British Pat. 1,026,336),
chloropentafluoroethane/1,1-difluoroethane azeotrope (U.S. Pat. 2,641,580),
dichlorofluoromethane,
dichlorodifluoromethane/chlorofluoromethane azeotrope (British Pat. 1,218,917),
chlorofluoromethane/1,2-dichlorotetrafluoroethane azeotrope (U.S. Pat. 3,505,232),
difluoromethane,
1,2-dibromotetrafluoroethane,
1,1,1-trifluoroethane,
1,1-difluoro-1-chlorethane,
1,1-difluoroethane,
bromotrifluoromethane/difluoromethane azeotrope (U.S. Pat. 3,418,242),
1,2-dichlorotetrafluoroethane/dichlorofluoromethane azeotrope (U.S. Pat. 2,630,686), and
hexafluoroethane/trifluoromethane azeotrope (Hadley et al. Journ. Amer. Chem. Soc. 62 3302 (1940)).
Trichlorofluoromethane,
dichlorodifluoromethane,
chlorofluoromethane,
1,1,2-trichloro-1,2,2-trifluoroethane,
1,2-dichloro-1,1,2,2-tetrafluoroethane,
1,1-difluoroethane/dichlorodifluoromethane azeotrope,
chloropentafluoroethane/chlorodifluoromethane azeotrope are preferred, dichlorodifluoromethane being most preferred.

Useful refrigeration oils include any of the oils which are well known in the art and are commonly used in heat transfer apparatus, e.g., naphthenic oils, paraffinic oils, alkylated benzene oils and polyalkyl silicate oils. Useful illustrative oils include for example

| Trade name | Oil type | Manufacturer |
| --- | --- | --- |
| "Suniso" 3GS | Naphthenic | Sun Oil Co. |
| "Suniso" 4GS | do | Do. |
| "Suniso" 5GS | do | Do. |
| "Capella" D | do | Texaco Oil Co. |
| "Delco" 15-117 | Paraffinic | Do. |
| GE (General Electric) Oil | do | Do. |
| *"Zerice" S-41 | Alkylated benzene | Humble Oil Co. (France). |
| "Fluicil" S-55K | Polyisobutyl silicate | Farbenfabriken Bayer A.G. |

* Sometimes called Alaska Bleu.

When the refrigeration liquid is a mixture of fluorocarbon refrigerant and refrigeration oil, the ratio of one to the other is not critical; however, about a 1:1 weight ratio is preferred.

The dyes useful in this invention include an anthraquinone dye or mixture of anthraquinone dyes having the structure

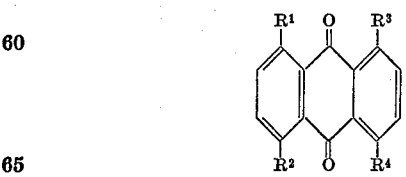

wherein one or two of the substituents $R^1$, $R^2$, $R^3$ or $R^4$ are anilino, the anilino group being substituted by 1 to 3 saturated alkyl groups having a total of 4 to 24 carbon atoms in the alkyl groups. These dyes may be prepared by various art-known methods, e.g., by reacting haloanthraquinones with alkyl substituted anilines as disclosed, for example, in U.S. Pats. 2,101,094 and 2,091,812; by reacting diaminoanthraquinones with alkyl substituted bromobenzenes as disclosed in U.S. Pat. 2,596,820, or by reacting dihydroxyanthraquinones with alkyl substituted anilines as disclosed in British Pat. 248,874.

The following dyes are illustrative of the dyes useful in this invention:

1,4-bis(2,4,6-triethylanilino)anthraquinone,
1-(2,4,6-triethylanilino)anthraquinone,
1,4-bis(4-dodecylanilino)anthraquinone,
1-(4-dodecylanilino)anthraquinone,
1,8-bis(4-dodecylanilino)anthraquinone,
1,5-bis(4-dodecylanilino)anthraquinone,
1,4-bis(4-butylanilino)anthraquinone,
1,8-bis(4-butylanilino)anthraquinone,
1,5-bis(4-butylanilino)anthraquinone,
1-(2,6-bis(2-propyl)anilino)anthraquinone,
1-(4-cyclohexylanilino)anthraquinone and
1,5-bis(4-cyclohexylanilino)anthraquinone.

Although dyes meeting the criteria set out in the present invention are satisfactory in their performance, closely related dyes are unsatisfactory. For example, dyes having free hydroxyl, halogen, or amino groups on the anthraquinone nucleus decompose under the contemplated use conditions and aromatic mono-substitution of amino groups present on the anthraquinone nucleus to yield aniline derivatives confers adequate stability on the molecule whereas alkyl substitution of the amino groups, such as 2-propyl substitution, does not.

There should be at least about 4 carbon atoms in the alkyl group or groups substituting the anilino group on the dye molecule in order to confer adequate solubility of the dye in the refrigeration liquid especially in the fluorocarbon refrigerants.

Intermediates should be removed from the final dye to avoid generally deleterious effects on the stability of the dye mixture. For example, in dyes of the class utilized in this invention which have been prepared by reacting 1-chloroanthraquinone with nuclearly substituted alkyl anilines, it is highly important that the aniline be removed at least to the extent that less than about 0.5 wt. percent remains in the dye mixure. If this is not done, tarring can occur in less than a day when the impure dye is heated to 400° F. in the presence of refrigerant dichlorodifluoromethane, refrigeration oil and materials of vapor compression heat transfer apparatus construction such as copper, aluminum and iron.

The dyes may be purified by any art-known means which will be readily apparent to one skilled in the art depending on the particular dye and synthesis method involved. For example, the removal of unreacted 4-dodecylaniline from the dye, 1-(4-dodecylanilino)anthraquinone prepared by reaction between the aniline and 1-chloroanthraquinone, is best accomplished by precipitation of the dye from HCl-acidified methanol solution by addition of water, followed by silica gel chromatography to remove the last traces of the aniline.

The red anthraquinone dyes are preferred for use in the compositions and process of this invention because the red color deposited at the site of a leak is more easily recognized than are the blue and green dyes of the invention class. Red dyes are produced on mono-substitution and by 1,5- and 1,8-disubstitution of the anthraquinone nucleus. Because of greater ease of preparation, dyes obtained by 1-mono-substitution are preferred. The red dye 1-(4-butylanilino)anthraquinone is most preferred.

The solubility of the dyes, utilized in this invention, in fluorocarbon refrigerants and in refrigeration oils increases with the number of carbon atoms in the alkyl groups substituting the anilino group. With one $C_{12}$-alkyl group substituting a single anilino group the solubility is as high as would normally be needed, for example, in a concentrate not intended to constitute the entire charge to the system. Since the difficulty of purification of the dye increases with the carbon content of the alkyl groups, it is preferred not to exceed about 12 carbon atoms in any one alkyl group or 24 total carbon atoms in the alkyl groups substituting the anilino group of the dye, Since solubility is adequate in dyes containing 4 carbon atoms in the alkyl group substituting a single anilino group and because preparation and purification is relatively simple, the red dye, 1-(4-butylanilino)anthraquinone, is most preferred, It should be noted that the anthraquinone dyes utilized in this invention do not raise the pour point of the common refrigeration oils above that point found for the pure oil.

The compositions of this invention can be prepared and incorporated into a refrigeration systems in several ways. For example, the pure dye could be added to the system before charging of refrigerant and refrigeration oil. Alternatively, the dye can be dissolved in either the refrigerant or the refrigeration oil in a mixture of the two before charging to the system in any art-known manner. Further, should one wish to introduce into the refrigeration liquid amounts of dye in excess of the normal solubility of the dye, inert cosolvents such as xylene can be employed.

The compositions of this invention are circulated through vapor compression heat transfer systems and in addition to fulfilling their normal use, e.g., heat transfer, they simultaneously detect leaks in the system. Special utility of the compositions of this invention is contemplated in the original charging of new refrigeration devices especially in automobile air conditioning and in the adding of make-up refrigerant to these devices.

EXAMPLES

The following examples are intended to be merely illustrative of the invention and not in limitation thereof. Unless otherwise indicated, all quantities are by weight.

Example 1

The solubilities of various dyes useful in this invention were measured in refrigeration oil. Useful refrigeration oils must possess several properties including stability at high temperatures on compression of the refrigerant which temperatures may approach 400° F.; compatibility with the refrigerant employed; pour and flocculation points below the evaporator temperature; high dielectiric strength sufficient to insulate an enclosed pump motor; and sufficient viscosity to seal the valves and piston of the pump. "Suniso" 3GS refrigeration oil was used in the following tests and is a commonly used refrigeration oil manufactured by the Sun Oil Company. The manufacturer reports the following properties.

Aromatics, percent _____ 38
Viscosity, SUS/210° F. by ASTM Method D161 __ 40.8
Pour point, ° F. _____ —45
Floc. point, ° F. _____ —68

Solubility was estimated by suspending a series of weighed amounts of dye in measured volumes of "Suniso" 3GS oil and stirring the mixtures. Solubilities reported are those corresponding to the largest sample which dissolved completely. The results are shown in Table I.

TABLE I
Solubility of dyes in refrigeration oil

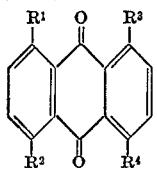

| Dye number | Substituents | | | | Color | Solubility in refrig. oil [1] (G./100 cc.) at 77° F. |
|---|---|---|---|---|---|---|
| | R[1] | R[2] | R[3] | R[4] | | |
| 1 | 2,4,6-triethylanilino | 2,4,6-triethylanilino | —H | —H | Blue | 2.5 |
| 2 | do | —H | —H | —H | Red | 1.5 |
| 3 | 4-dodecylanilino | 4-dodecylanilino | —H | —H | Blue-green | >10 |
| 4 | do | —H | —H | —H | Red | ~10 |
| 5 | do | —H | 4-dodecylanilino | —H | Red | >10 |
| 6 | do | —H | —H | 4-dodecylanilino | Red | >10 |
| 7 | 4-butylanilino | 4-butylanilino | —H | —H | Blue-green | 1.5 |
| 8 | do | —H | —H | —H | Red | 1.5 |
| 9 | do | —H | 4-butylanilino | —H | Red | ~3.0 |
| 10 | do | —H | —H | 4-butylanilino | Red | 1.5 |
| 11 | 2,6-di-(2-propyl)anilino | —H | —H | —H | Red | ~2.0 |
| 12 | 2-methylanilino | 2-methylanilino | —H | —H | Blue | 1.0 |
| 13 | 4-methoxyanilino | 4-methoxyanilino | —H | —H | Green | ~1.5 |
| 14 | 4-methylphenylsulfamido | 4-methylphenylsulfamido | —H | —H | Bronze | <1.5 |

[1] "Suniso" 3GS, room temp.

NOTE.—Dyes 1-11 together with a refrigerant, refrigeration oil or refrigerant-refrigeration oil, are within the scope of this invention. Dyes 12-14 are not.

The solubility of 1 - (4 - butylanilino)anthraquinone tested in other refrigeration oils in addition to "Suniso" 3GS and the solubilities thus determined are shown in Table II below.

TABLE II

| Oil: | Solubility in refrigerant oil (g./100 cc., 77° F.) |
|---|---|
| "Suniso" 4GS | 1.5 |
| "Suniso" 5GS | 1.5 |
| "Capella" D | 1.5 |
| "Delco" 15–117 | 0.75 |
| "Zerice" S–41 | 3.8 |
| "Fluicil" S–55K | 1.3 |

The presence of at least up to 1 g. of 1-(4-butylanilino)anthraquinone or 1-(4-dodecylanilino)anthraquinone in 100 ml. of "Suniso" 3GS and similar refrigeration oils, i.e., "Suniso" 5GS (Sun Oil Company) and "Capella" E (Texaco Inc.), did not affect the pour points of the oils as measured by the ASTM D97–66 method.

Example 2

The solubilities of the preferred dye, 1-(4-butylanilino)anthraquinone, in various fluorinated refrigerants are shown in Table III.

Solubility in chlorodifluoromethane and in the azeotrope of chloropentafluoroethane/chlorodifluoromethane was measured by charging 1.00 g. of dye and 50 ml. of refrigerant to a 140 ml. stainless steel gas cylinder fitted with a dip leg and fritted glass filter at the open end of the dip leg. After equilibrating at the indicated temperatures, the liquid contents were discharged through the dip leg to a tared beaker. After drying, the residue was weighed. By measuring the difference in weight, the amount of dissolved dye was calculated.

1,1,2-trichloro - 1,2,2 - trifluoroethane (and trichlorofluoromethane at 0° F. and 30° F.) being a liquid at the indicated temperature was not confined, but was simply stirred with the dye and filtered. The weight of the residue was determined as above.

Other refrigerants, being normally gaseous but having lower vapor pressures than those refrigerants treated in stainless steel cylinders, were treated in 200 ml. aerosol containers similarly equipped and the weight of residue was determined as above.

The solubility desired will vary depending on the tinctorial quality of the dye used; however, a solubility of at least about 0.05 g./100 cc. of refrigerant is normally preferred. As 1-(4-butylanilino)anthraquinone is the least soluble dye in fluorinated refrigerants of the refrigeration compositions of this invention, it follows that all other dyes are sufficiently soluble in the refrigerants of the invention.

It is recognized that the refrigeration oil in which the subject dyes are soluble passes at least in small amounts throughout a refrigeration system. It follows therefore that, even in the case of the last listed refrigerant mixture of Table III, substantial amounts of the leak indicator dye will be carried to all parts of the system. Also it is recognized that fluorinated refrigerants are, to a substantial degree, miscible with refrigeration oils and thus, at least in part, a single refrigeration oil-refrigerant phase is formed wherein the subject dyes are more soluble than in the refrigerant alone. For example, on a weight percent basis 1-(4-butylanilino)anthraquinone was found to be soluble to the extent of 0.43% at 77° F. and 0.29% at 0° F. in a 10 to 1 by wt. mixture of the azeotrope of chloropentafluoroethane/chlorodifluoromethane and "Zerice" S–41 alkylated benzene oil.

TABLE III
Solubility of 1-(4-butylanilino) anthraquinone [1] in fluorinated refrigerants at various temperatures

| Refrigerant | Solubility (g./100 cc. of refrigerant) | | | |
|---|---|---|---|---|
| | 0° F. | 30° F. | 50° F. | 77° F. |
| Trichlorofluoromethane | 1.1 | 1.2 | 1.3 | 1.3 |
| Dichlorodifluoromethane | 0.1 | | 0.23 | 0.03 |
| Chlorodifluoromethane | 1.1 | | | 1.3 |
| 1,1,2-trichloro-1,2,2-trifluoroethane | 0.17 | | 0.38 | 0.47 |
| 1,2-dichloro-1,1,2,2-tetrafluoroethane | | 0.08 | 0.16 | 0.24 |
| 1,1-difluoroethane/dichlorodifluoromethane [2] | 0.16 | | 0.31 | 0.38 |
| Chloropentafluoroethane/chlorodifluoromethane [3] | | 0.03 | 0.08 | 0.14 |

[1] Dye No. 8 in Table I.
[2] Azeotrope: U.S. Pat. 2,479,259, Re. 23,358.
[3] Azeotrope: U.S. Pat. 2,641,579.

Example 3

The thermal stability of various dyes in a refrigerant-refrigerant oil mixture was measured under conditions analogous to the most severe conditions which would be encountered under practical refrigeration conditions. The degree of degradation shown in Table IV is probably several hundred times the degree of degradation which would be observed in practice under normal operating conditions. In the tests of this example the entire sample was continuously exposed to high temperatures whereas in practice only a small portion of the mixture is exposed at any one time to high temperatures, i.e., on compression.

The tests consisted of sealing in glass tubes, in the absence of air as is customary in the stability tests in this field (ASHRAE Transactions, Jan. 25-28, 1965), a mixture consisting of 0.05 wt. percent of dye based on the weight of the oil and dichlorodifluoromethane mixture,
Mixture, as indicated, of dichlorodifluoromethane and "Suniso" 3GS refrigeration oil,
One coupon each of:
    cold rolled steel No. 1010
    TS aluminum No. 1100
    purified copper.

The sealed tubes were heated in an oven at the temperatures and for the times indicated. The volatile materials were removed and the residual material was taken up in benzene. Aliquot portions were analyzed by visible light spectroscopy. Comparison of the heights of the principal absorption peaks permitted calculation of the amount, expressed in percent, of dye destroyed. The results are shown in Table IV.

oil. In a second test utilizing the same dye and refrigerant-oil mixture as above but having a leak rate of 1.2 oz./yr., a substantial amount of easily visible red oil was observed at the leak site after 3½ days.

The same solution deposited no undissolved dye on a 35 micron nylon filter.

Molecular sieves appear to be generally operable as an efficient drying means for mixtures of the dyes utilized in this invention with refrigeration oil and fluorinated refrigerants.

The dyes utilized in this invention may be easily removed from automobile finishes with aromatic solvents, for example xylene. The preferred method of dye removal is to place a xylene soaked cloth over the spot for 10–15 minutes thus to remove the absorbed dye.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A leak detecting refrigeration composition which consists essentially of
(A) a refrigeration liquid selected from the group consisting of
(a) a fluorocarbon refrigerant selected from the group consisting of
trichlorofluoromethane,
dichlorodifluoromethane,
chlorodifluoromethane,
1,1,2-trichloro-1,2,2-trifluoroethane,
1,2-dichloro-1,1,2,2-tetrafluoroethane,

TABLE IV

Stability of dyes in refrigeration oil [1] and dichlorodifluoromethane in the presence of Fe, Cu, Al [2]

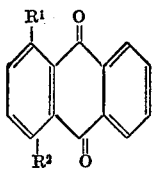

| Dye No. | Substituents R1 | Substituents R2 | Prin. abs. peak (mμ) | CCl₂F₂/oil (vol.) | Temp. (°F.) | Time (days) | Decomp. (percent) |
|---|---|---|---|---|---|---|---|
| 1 | 2,4,6-triethylanilino | 2,4,6-triethylanilino | 630 | 1 | 400 | 1 | 6.7 |
| 1 | do | do | 630 | 1 | 400 | 2 | 16.5 |
| 4 | 4-dodecylanilino | —H | 510 | 1 | 400 | 1 | 0.0 |
| 4 | do | —H | 510 | 1 | 400 | 2 | 10.0 |
| 4 | do | —H | 510 | 4 | 300 | 5 | 0.0 |
| 8 | 4-butylanilino | —H | 510 | 4 | 300 | 5 | 0.0 |
| 8 | do | —H | 510 | 1 | 300 | 5 | 0.05 |
|  | 2-propylamino | 2-propylamino | 630 | 1 | 400 | 2 | >80 |
|  | Du Pont Oil Red A [3] |  |  | 1 | 400 | <1 | 100 |
|  | do [3] |  |  | 1 | 300 | 2 | 100 |
|  | do [3] |  |  | 1 | 250 | 6 | 10 |

[1] "Suniso" 3GS.
[2] Normal materials of construction of refrigeration apparatus.
[3] Bisazo dye prepared from methyl anilines and 2-naphthol.

Example 4

The solubility of dyes useful in this invention in refrigeration oil appears to be insensitive to low temperatures. For example, 0.25 wt. percent 1-(4-butylanilino)anthraquinone in "Suniso" 5GS and "Capella" E refrigeration oil was not precipitated even at −58° F.

A simulated leak was created passing 0.3 ounce of dichlorodifluoromethane per year, a typical specification leakage rate in air conditioners in the automobile industry (except at the shaft seal where 3.2 to 5 oz./yr. loss is normally permitted). The leak was detectable on wiping with a white cloth after eight hours. The mixture subjected to the test consisted of 0.05 g. of 1-(4-butylanilino) anthraquinone in 100 ml. of a 5/1 (vol.) mixture of dichlorodifluoromethane and "Suniso" 3GS refrigeration 1,1-difluoroethane/dichlorodifluoromethane azeotrope,
chloropentafluoroethane/chlorodifluoromethane azeotrope,
chlorotrifluoromethane,
chlorotrifluoromethane/trifluoromethane azeotrope,
bromotrifluoromethane,
trifluoromethane,
chloropentafluoroethane,
difluoromethane/chloropentafluoroethane azeotrope,
chloropentafluoroethane/1,1-difluoroethane azeotrope,
dichlorofluoromethane, dichlorodifluoromethane/chlorofluoro-
  methane azeotrope,
chlorofluoromethane/1,2-dichloroetetra-
  fluoroethane azeotrope,
difluoromethane,
1,2-dibromotetrafluoroethane,
1,1,1-trifluoroethane,
1,1-difluoro-1-chloroethane,
1,1-difluoroethane,
bromotrifluoromethane/difluoromethane
  azeotrope,
1,2-dichlorotetrafluoroethane/dichloro-
  fluoromethane azeotrope, and
hexafluoroethane/trifluoromethane
  azeotrope,
(b) a refrigeration oil selected from the group consisting of naphthenic oils, paraffinic oils, alkylated benzene oils and polyalkyl silicate oils, and
(c) a mixture of (a) and (b) and
(B) an anthraquinone dye or mixture of anthraquinone dyes having the structure

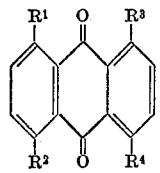

wherein $R^1$, $R^2$, $R^3$ and $R^4$ are each H or an anilino group substituted by from 1 to 3 saturated alkyl groups having a total of from 4 to 24 carbon atoms, and wherein at least 2 and no more than 3 of $R^1$, $R^2$, $R^3$ and $R^4$ are hydrogen, and
wherein the anthaquinone dye is soluble in the refrigeration liquid, the concentration of said dye being at least about 0.007 gram per 100 cc. of said refrigeration liquid.

2. A composition according to claim 1 wherein the refrigeration liquid is a fluorocarbon refrigerant selected from the group consisting of trichlorofluoromethane, dichlorodifluoromethane, chlorodifluoromethane, 1,1,2-trichloro-1,2,2-trifluoroethane, 1,2-dichloro-1,1,2,2-tetrafluoroethane, 1,1 - difluoroethane/dichlorodifluoromethane azeotrope, and chloropentafluoroethane/chlorodifluoromethane azeotrope.

3. A composition according to claim 2 wherein the fluorocarbon refrigerant is dichlorodifluoromethane.

4. A composition according to claim 1 wherein the refrigeration liquid is a refrigeration oil.

5. A composition according to claim 1 wherein the refrigeration liquid is a mixture of a refrigeration oil and a fluorocarbon refrigerant selected from the group consisting of trifluorofluoromethane, dichlorodifluoromethane, chlorodifluoromethane, 1,1,2-trichloro-1,2,2-trifluoroethane, 1,2-dichloro-1,1,2,2-tetrafluoroethane, 1,1-difluoroethane/dichlorodifluoromethane azeotrope, and chloropentafluoroethane/chlorodifluoromethane azeotrope.

6. A composition according to claim 5 wherein the fluorocarbon refrigerant is dichlorodifluoromethane.

7. A composition according to claim 5 wherein the weight ratio of refrigeration oil to fluorocarbon refrigerant is about 1:1.

8. A composition according to claim 6 wherein the weight ratio of refrigeration oil to dichlorodifluoromethane is about 1:1.

9. A composition according to claim 1 wherein the anthraquinone dye is 1-(4-butylanilino)anthraquinone.

10. A composition according to claim 2 wherein the anthraquinone dye in 1-(4-butylanilino)anthraquinone.

11. A composition according to claim 3 wherein the anthraquinone dye is 1-(4-butylanilino)anthraquinone.

12. A composition according to claim 4 wherein the anthaquinone dye is 1-(4-butylanilino)anthraquinone.

13. A composition according to claim 5 wherein the anthraquinone dye is 1-(4-butylanilino)anthraquinone.

14. A composition according to claim 6 wherein the anthraquinone dye is 1-(4-butylanilino)anthraquinone.

15. A process for detecting leaks in a vapor compression heat transfer system which process comprises circulating through said heat transfer system a composition consisting essentially of
(A) a refrigeration liquid selected from the group consisting of
  (a) a fluorocarbon refrigerant selected from the group consisting of
    trichlorofluoromethane,
    dichlorodifluoromethane,
    chlorodifluoromethane,
    1,1,2-trichloro-1,2,2-trifluoroethane,
    1,2-dichloro-1,1,2,2-tetrafluoroethane,
    1,1-difluoroethane/dichlorodifluoromethane azeotrope,
    chloropentafluoroethane/chlorodifluoromethane azeotrope,
    chlorotrifluoromethane,
    chlorotrifluoromethane/trifluoromethane azeotrope,
    bromotrifluoromethane,
    trifluoromethane,
    chloropentafluoroethane
    difluoromethane/chloropentafluoroethane azeotrope,
    chloropentafluoroethane/1,1-difluoroethane azeotrope,
    dichlorofluoromethane,
    dichlorodifluoromethane/chlorofluoromethane azeotrope,
    chlorofluoromethane/1,2,-dichlorotetrafluoroethane azeotrope,
    difluoromethane,
    1,2-dibromotetrafluoroethane,
    1,1,1-trifluoroethane,
    1,1-difluoro-1-chloroethane,
    1,1-difluoroethane,
    bromotrifluoromethane/difluoromethane azeotrope,
    1,2-dichlorotetrafluoroethane/dichlorofluoromethane azeotrope, and
    hexafluoroethane/trifluoromethane azeotrope,
  (b) a refrigeration oil selected from the group consisting of naphthenic oils, paraffinic oils, alkylated benzene oils and polyalkyl silicate oils, and
  (c) a mixture of (a) and (b) and
(B) an anthraquinone dye or mixture of anthraquinone dyes having the structure

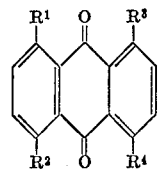

wherein $R^1$, $R^2$, $R^3$ and $R^4$ are each H or an anilino group substituted by from 1 to 3 saturated alkyl groups having a total of from 4 to 24 carbon atoms, and wherein at least 2 and no more than 3 of $R^1$, $R^2$ $R^3$ and $R^4$ are hydrogen, and
wherein the anthraquinone dye is soluble in the refrigeration liquid, the concentration of said dye being at least about 0.007 gram per 100 cc. of said refrigeration liquid.

(References on following page)

References Cited

UNITED STATES PATENTS

| | | | |
|---|---|---|---|
| 1,915,965 | 6/1933 | Williams | 252—408 |
| 2,596,820 | 5/1952 | Ogilvie | 260—378 X |
| 3,370,013 | 2/1968 | Labac | 252—408 X |
| 3,399,025 | 8/1968 | Nicholson | 8—4 |
| 3,489,898 | 1/1970 | Alburger | 252—301.2 P X |

FOREIGN PATENTS

| | | |
|---|---|---|
| 1,567,508 | 5/1969 | France. |
| 579,519 | 8/1946 | Great Britain. |
| 1,137,595 | 12/1968 | Great Britain. |

LEON D. ROSDOL, Primary Examiner

H. A. PITLICK, Assistant Examiner

U.S. Cl. X.R.

8—39; 252—408; 260—378